US011528258B2

(12) United States Patent
Lenz et al.

(10) Patent No.: US 11,528,258 B2
(45) Date of Patent: Dec. 13, 2022

(54) SYSTEM AND APPARATUS FOR DATA CONFIDENTIALITY IN DISTRIBUTED LEDGER

(71) Applicant: INTEL CORPORATION, Santa Clara, CA (US)

(72) Inventors: Oron Lenz, Ein-Carmel (IL); Alex Nayshtut, Gan Yavne (IL); Alex Berenzon, Zikhron Ya'akov (IL); Ishai Nadler, Haifa (IL); Yoni Wolf, Efrat (IL)

(73) Assignee: INTEL CORPORATION

( * ) Notice: Subject to any disclaimer, the term of this patent is extended or adjusted under 35 U.S.C. 154(b) by 169 days.

(21) Appl. No.: 16/229,964

(22) Filed: Dec. 21, 2018

(65) Prior Publication Data

US 2019/0132295 A1 May 2, 2019

Related U.S. Application Data

(60) Provisional application No. 62/754,678, filed on Nov. 2, 2018.

(51) Int. Cl.
*H04L 29/00* (2006.01)
*H04L 9/40* (2022.01)
(Continued)

(52) U.S. Cl.
CPC ........ *H04L 63/0428* (2013.01); *G06F 16/182* (2019.01); *G06F 21/57* (2013.01);
(Continued)

(58) Field of Classification Search
CPC . H04L 63/0428; H04L 63/123; H04L 63/126;
H04L 63/067; H04L 9/0861; H04L 67/10;
H04L 9/0637; H04L 2209/38; H04L 9/32;
H04L 9/321; H04L 9/3213; H04L 9/3215;
H04L 9/3218; H04L 9/3221; H04L
9/3226; H04L 9/3228; H04L 9/3231;
H04L 9/3234; H04L 9/3236; H04L
9/3239; H04L 9/3242; H04L 9/3247;
H04L 9/3249;
(Continued)

(56) References Cited

U.S. PATENT DOCUMENTS 10,715,339 B1* 7/2020 Wei .................. H04L 9/0894
2018/0174097 A1* 6/2018 Liu .................. H04L 9/3239
(Continued)

*Primary Examiner* — Brandon Hoffman
*Assistant Examiner* — Helai Salehi
(74) *Attorney, Agent, or Firm* — KDB Firm PLLC

(57) ABSTRACT

A system and apparatus for data confidentiality in a distributed ledger are disclosed. The system and apparatus preserve qualities of distributed ledgers, such as transparency, integrity, and redundancy, while also providing confidentiality, scalability, and security not previously available in distributed ledgers. The system includes a data confidentiality module that exploits a trusted execution environment for both transaction processing and key synchronization. The apparatus accessing the distributed ledger provides for new nodes joining the network, sending transactions to the ledger by existing nodes, securely processing the transaction using the trusted execution environment, securing transmission to the logic layer for application of business logic, reading and writing data to local storage, and reading encrypted transactions.

14 Claims, 13 Drawing Sheets

(51) Int. Cl.
  *G06F 21/60*   (2013.01)
  *G06F 21/57*   (2013.01)
  *H04L 9/08*    (2006.01)
  *H04L 67/10*   (2022.01)
  *G06F 16/182*  (2019.01)
  *H04L 9/06*    (2006.01)
  *G06F 21/64*   (2013.01)
  *H04L 9/00*    (2022.01)

(52) U.S. Cl.
  CPC .......... *G06F 21/602* (2013.01); *G06F 21/604* (2013.01); *G06F 21/64* (2013.01); *H04L 9/0637* (2013.01); *H04L 9/0861* (2013.01); *H04L 63/067* (2013.01); *H04L 63/101* (2013.01); *H04L 63/12* (2013.01); *H04L 63/123* (2013.01); *H04L 63/126* (2013.01); *H04L 67/10* (2013.01); *G06F 2221/2141* (2013.01); *H04L 9/50* (2022.05)

(58) Field of Classification Search
  CPC ... H04L 9/3252; H04L 9/3255; H04L 9/3257; H04L 9/3263; H04L 9/3265; H04L 9/3268; H04L 9/3271; H04L 9/3273; H04L 63/08; H04L 63/0807; H04L 63/0815; H04L 63/0823; H04L 63/083; H04L 63/0838; H04L 63/0846; H04L 63/0853; H04L 63/0861; H04L 63/0869; H04L 63/0876; H04L 63/0884; H04L 63/0892; G06F 21/602; G06F 21/604; G06F 21/57; G06F 16/182; G06F 21/64; G06F 2221/2141
  See application file for complete search history.

(56) References Cited

U.S. PATENT DOCUMENTS

| | | | |
|---|---|---|---|
| 2018/0227275 A1* | 8/2018 | Russinovich | H04L 9/3265 |
| 2018/0239897 A1* | 8/2018 | Ventura | G06F 21/57 |
| 2019/0058696 A1* | 2/2019 | Bowman | H04L 9/3236 |
| 2021/0211468 A1* | 7/2021 | Griffin | H04L 9/0825 |

* cited by examiner

SYSTEM AND APPARATUS FOR DATA CONFIDENTIALITY IN DISTRIBUTED LEDGER

CROSS-REFERENCE TO RELATED APPLICATIONS

This application claims the benefit of and priority to previously filed U.S. Provisional Patent Application Ser. No. 62/754,678 filed on Nov. 2, 2018, entitled "System and apparatus for data confidentiality in distributed ledger", which is hereby incorporated by reference in its entirety.

TECHNICAL FIELD

This application relates to blockchain and, more particularly, to distributed ledgers for maintaining dynamic data (transactions).

BACKGROUND

Blockchain is a technology that originated in the cryptocurrency realm, but its usage may extend to many other arenas, from quality assurance to supply chain and financial sectors. Blockchain consists of a distributed ledger, which is essentially a database located on disparate nodes. In general, the ledger is a series of sequential blocks. Each node maintains a copy of the distributed ledger, ensuring data integrity, auditability, redundancy, and so on.

The blocks making up the distributed ledger each contain records, also known as operations or transactions. The transactions are not distributed by a central authority but are instead constructed by the nodes. In general, transactions are entered in the ledger after being validated or "accepted" by a specified number of nodes. Thus, each node may independently build the ledger from validated transactions, such that all nodes arrive at the same ledger. The cost of trust in the contents of the ledger, traditionally provided by attorneys, bankers, notaries, and so on, is avoided with blockchain technology. Thus, blockchains make good platforms for "smart contracts" between two entities wanting to exchange goods or services.

By design, the distributed ledger is transparent. In other words, everything written to the ledger can be viewed and verified by each participant node. With some usages of blockchain, this transparency is desired. However, it prevents use of the blockchain for confidential information.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a system and apparatus for data confidentiality in a distributed ledger are disclosed. The system and apparatus preserve qualities of distributed ledgers, such as transparency, integrity, and redundancy, while also providing confidentiality, scalability, and security not previously available in distributed ledgers. The system includes a data confidentiality module that exploits a trusted execution environment for both transaction processing and key synchronization. The apparatus accessing the distributed ledger provides for new nodes joining the network, sending transactions to the ledger by existing nodes, securely processing the transaction using the trusted execution environment, secure transmission to the logic layer for application of business logic, reading and writing data to local storage, and reading encrypted transactions.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. In other instances, well-known structures, materials, or operations are not shown or described in detail to avoid obscuring aspects of the disclosure. The following detailed description is, therefore, not to be construed in a limiting sense, as the scope of the subject matter is defined by the claims.

A blockchain is a distributed ledger or database that is shared across a peer-to-peer (P2P) network of computers, known as nodes. By decentralizing the computers used to verify the database, the blockchain lacks a central authority over the database. The P2P network, connected by the Internet, a Local Area Network (LAN), a Wide Area Network (WAN), and so on, provides communications and facilitates the exchange of information between nodes.

Introductory FIGS. 1-4 provide context for the system and apparatus for data confidentiality described herein, which are introduced in FIG. 5 and further described and illustrated in FIGS. 6-14, below.

Figure 1:
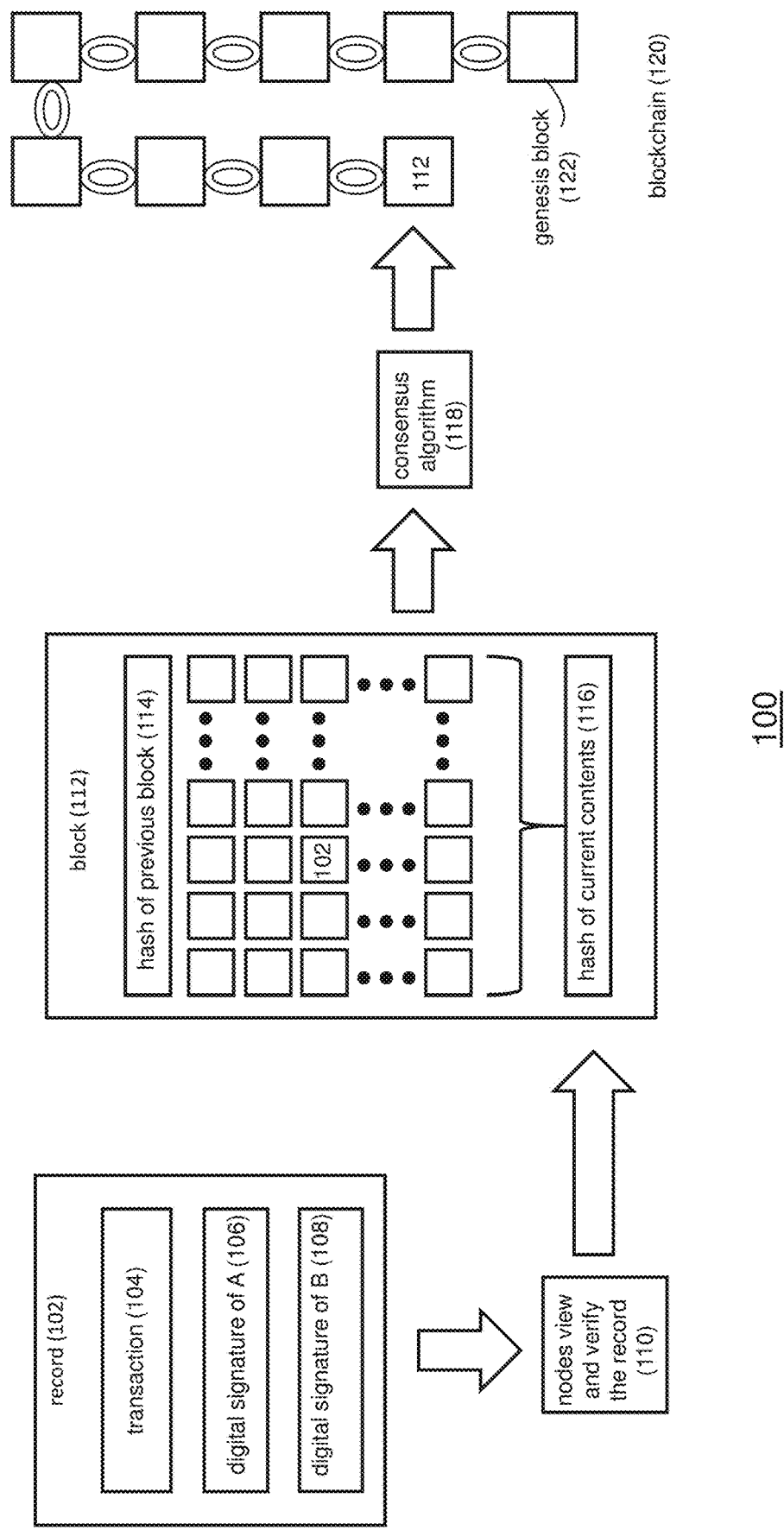
FIG. 1 is a schematic block diagram of an exemplary system to store records in a distributed ledger or blockchain, in accordance with some embodiments.

FIG. 1 is a schematic block diagram of an exemplary system 100, according to some embodiments, for adding a record to a blockchain. A record 102 consists of a transaction 104, which may be any of a variety of agreements made between two parties, given as parties A and B. The record 102 also includes a digital signature of party A 106 and a digital signature of party B 108. The transaction 104 may include, but is not limited to, a transfer of digital currency, such as in payment for a good or service, a contract between parties A and B, and so on. Each record 102 of the system 100 includes the transaction 104 and the digital signatures 106 and 108 of parties A and B, respectively.

The P2P network of nodes independently view and verify 110 the record 102 containing the transaction 104 between parties A and B before the record, and thus the transaction, can become part of a blockchain 120. The way in which the nodes perform this view and verification operation 110 is beyond the scope of this disclosure and may vary, depending on the application of the blockchain 120. Once nodes confirm the veracity of the record 102, the record becomes part of a collection of records in a block 112. In addition to the plurality of records 102, the block 112 also contains a hash of a previous block 114 of the blockchain 120, as well as a hash of the current contents 116 of the block. Any change to the contents of the block 112 would cause the hash 116 to change. This is designed to protect the record 102 inside the block 112, and thus the transaction 104 inside the record.

Before becoming part of the blockchain 120, the block 112 is subjected to a consensus algorithm 118. For the cryptocurrency bitcoin, which uses blockchain technology, the consensus algorithm is known as proof of work, which uses complex mathematical operations performed by some of the nodes. There exist many other types of consensus algorithms, such as proof of stake, proof of elapsed time (PoET), proof of authority (PoA), proof of capacity, proof of activity, proof of burn, delegated proof of stake (DPoS), byzantine fault tolerance, proof of importance, and direct acyclic graphs (DAGs). In the case of bitcoin, the proof of work slows down the acceptance of the block into the blockchain. Once the block 112 passes the consensus algorithm 118 by a majority of nodes, the block is added to the blockchain 120.

A genesis block 122 does not include a hash of the previous block, but other blocks of the blockchain 120 do include the hash linking the block to the previous block. The combination of these linking hashes and the consensus algorithm help to make the blockchain secure.

Figure 2:
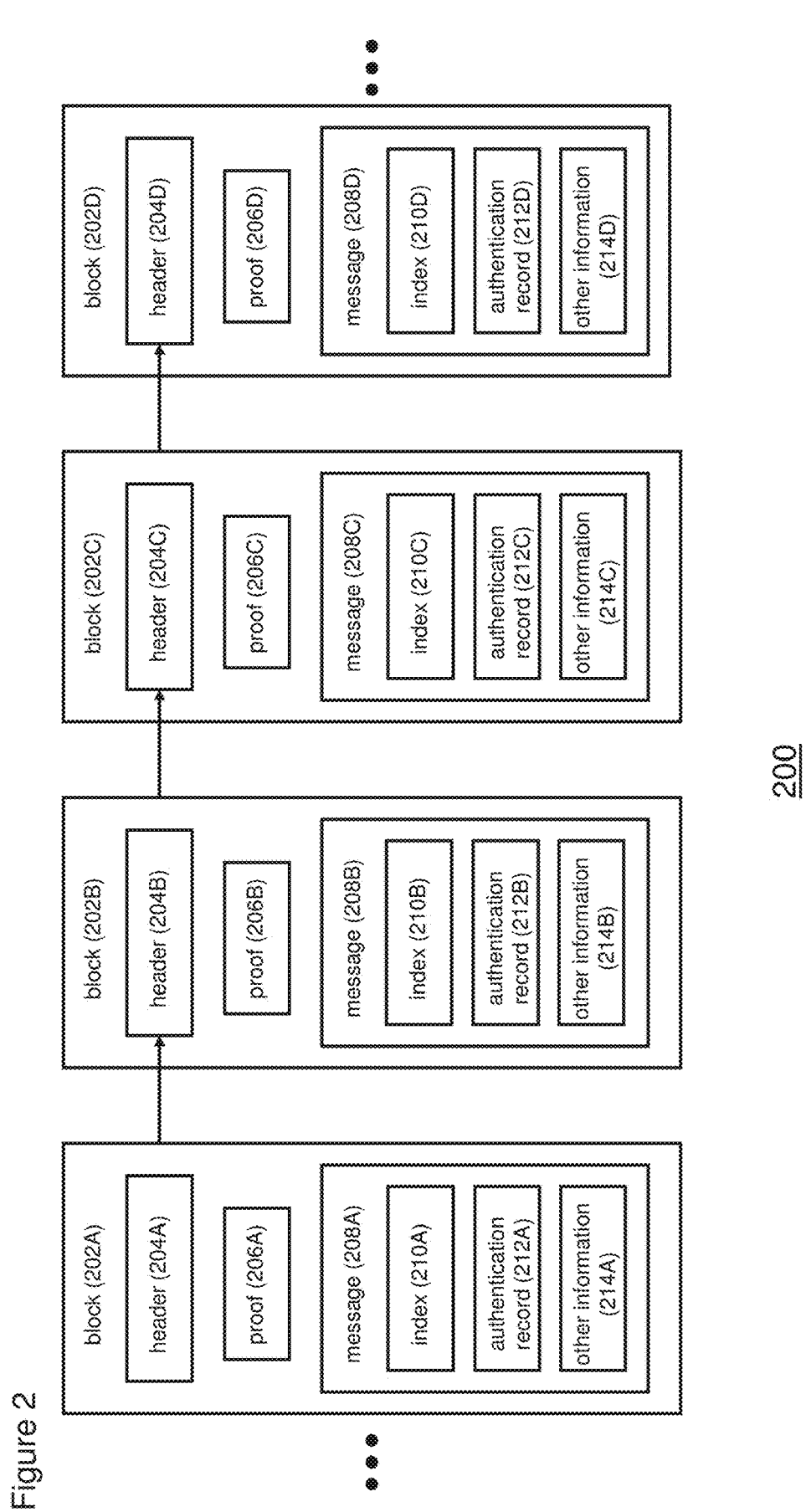
FIG. 2 a second view of a distributed ledger or blockchain, in accordance with some embodiments.

FIG. 2 is another view of a blockchain 200, according to some embodiments. The blockchain 200 consists of a plurality of blocks 202A-202D (collectively, "blocks 202"), each of which include respective headers 204A-204D (collectively, "headers"), proofs 206A-206D (collectively, "proofs 206"), and messages 208A-208D (collectively, "messages 208"). Messages 208 further respectively include indexes 210A-210D (collectively, "indexes 210"), authentication records 212A-212D (collectively, "authentication records 212"), and other information 214A-214D (collectively, "other information 214"). Ellipses on either side of the blocks 202 indicate that the blockchain 200 may be made up of many more blocks not shown.

Respective headers 204 identify each block 202 as distinct from another block. The headers 202 may include a hash value generated by a hash function. A hash function is any function that can be used to map input data of arbitrary size to a hash value of a fixed size. Thus, the hash of the previous block 114 and the hash of current contents 116 in the block 112 of FIG. 1 are the same length. Another property of a hash function is that it is extremely difficult to find another block that ends up with the same hash, so faking a previous block is unlikely. As one example, in FIG. 2, the header 204B of block 202B may include the hash of the block 202A as well as a hash of the message 208B within its own block (such as a Merkel root), and a timestamp.

As described with respect to FIG. 1, blocks to be added to a blockchain satisfy a consensus algorithm. In the example of FIG. 2, each block 202 includes a respective proof 206, short for proof of work. Further, in some embodiments, the headers 204 of respective blocks 202 include a nonce chosen to ensure the header satisfies the proof of work condition. The proof of work condition may be satisfied once the hash of the header falls within a predetermined range of values, as one example. Or, the header may be digitally signed within a cryptographic key of an authorized user, with the digital signature being included in the header.

The messages 208 of respective blocks 202 may include index information 210, authentication information 212, and other information 214. Index information 210 may include non-sensitive information, such as a user's name, phone number, and email address, for example. Reference to other blocks in the blockchain (or the hash of the block), such as those associated with the same user, may also be part of the index information. The index information may be encrypted or otherwise obfuscated so as to limit who is able to view the index information 210. Or the index information may include a hash of the user's personal information (e.g., name, phone number, email address).

In some embodiments, the messages 208 of respective blocks 202 also includes an authentication record 212. The authentication record 212 may include information that enables subsequent auditing of transactions. Suppose, for example, the blockchain 200 is a private blockchain accessible only to a select group, such as a stock exchange. The authentication record may identify a computing system that is allowed access to the blockchain 200. The authentication record 212 may also identify a purpose of an authentication request, such as the creation of a relationship, such as a brokerage relationship, with the stock exchange. The authentication record 212 may also include a result of an authentication request, such as whether the purpose of the authentication request was achieved. The authentication record 212 may also include information related to the authentication request, such as additional contact information, financial information, demographic information, and so on, associated with the authentication request. Like the index information 210, the authentication information 212 may be encrypted, such as with a cryptographic key. Other information 214 not heretofore described may also be part of respective messages 208 of blocks 202.

Cryptographic keys may be used to encrypt elements of the blocks 202, including the messages 208. Cryptographic keys may be associated with an authorized user or system, for example. Corresponding cryptographic keys may enable decryption of the encrypted message elements. For example, the message in a block may be encrypted with a symmetric key, and the same symmetric key may be available for decrypting the encrypted element. Or, the message may be encrypted with a private key while a corresponding public key is used to decrypt the encrypted message.

Figure 3:
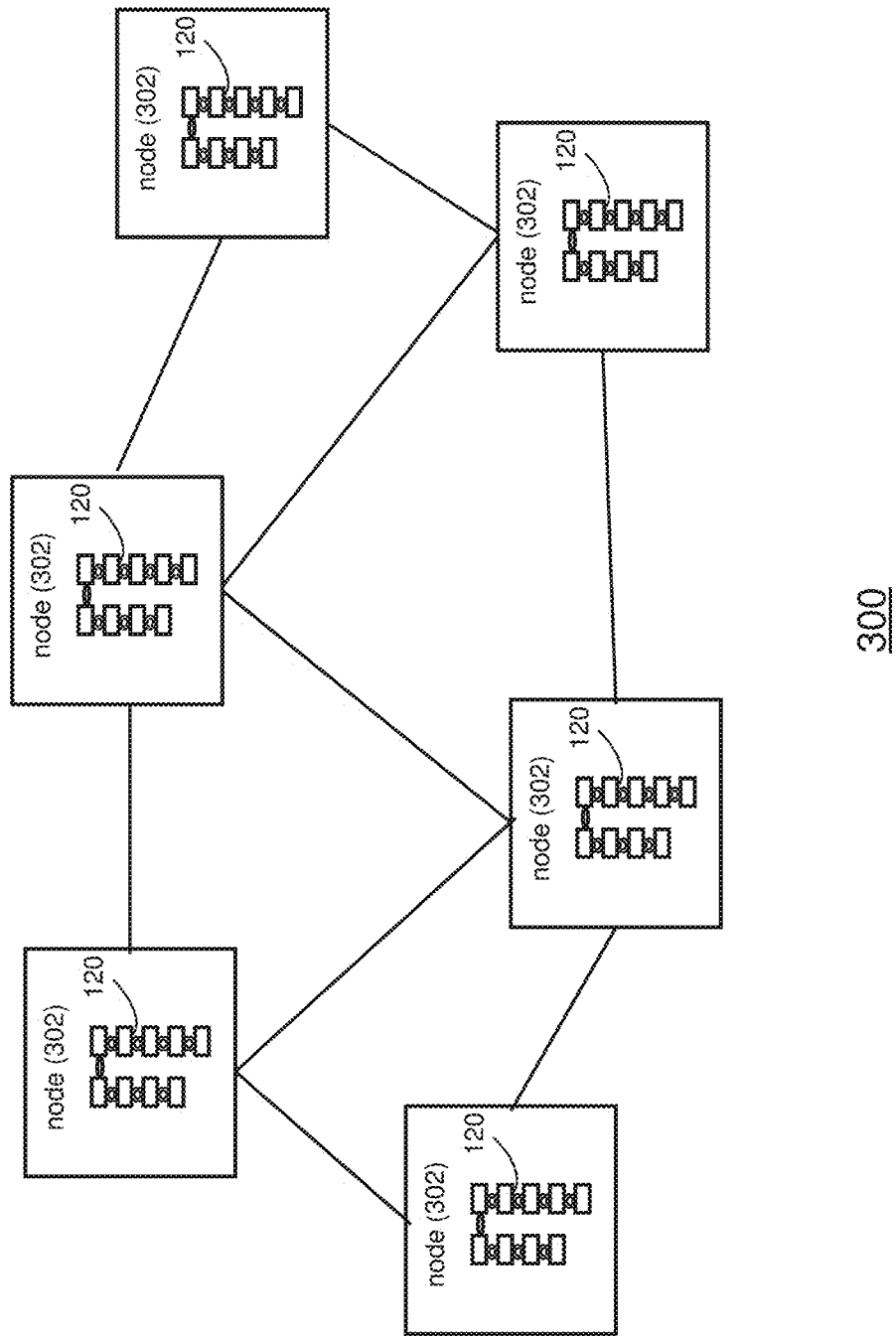
FIG. 3 is a simplified diagram of the distributed ledger or blockchain infrastructure, in accordance with some embodiments.

FIG. 3 is a simplified diagram of the distributed ledger or blockchain infrastructure, also known herein as a node network 300, according to some embodiments. As described above, the network 300 consists of a plurality of nodes 302, each of which include a copy of the distributed ledger or blockchain 120 (FIG. 1). The nodes 302 consist of computing devices, such as servers, workstations, or special-purpose computing devices. The nodes 302 are interconnected and may be part of a communications network, such as the Internet, or a private network, such as a local area network, and so on. The blockchain 120 is thus a distributed database or distributed ledger of all the transactions stored inside its blocks.

Figure 4:
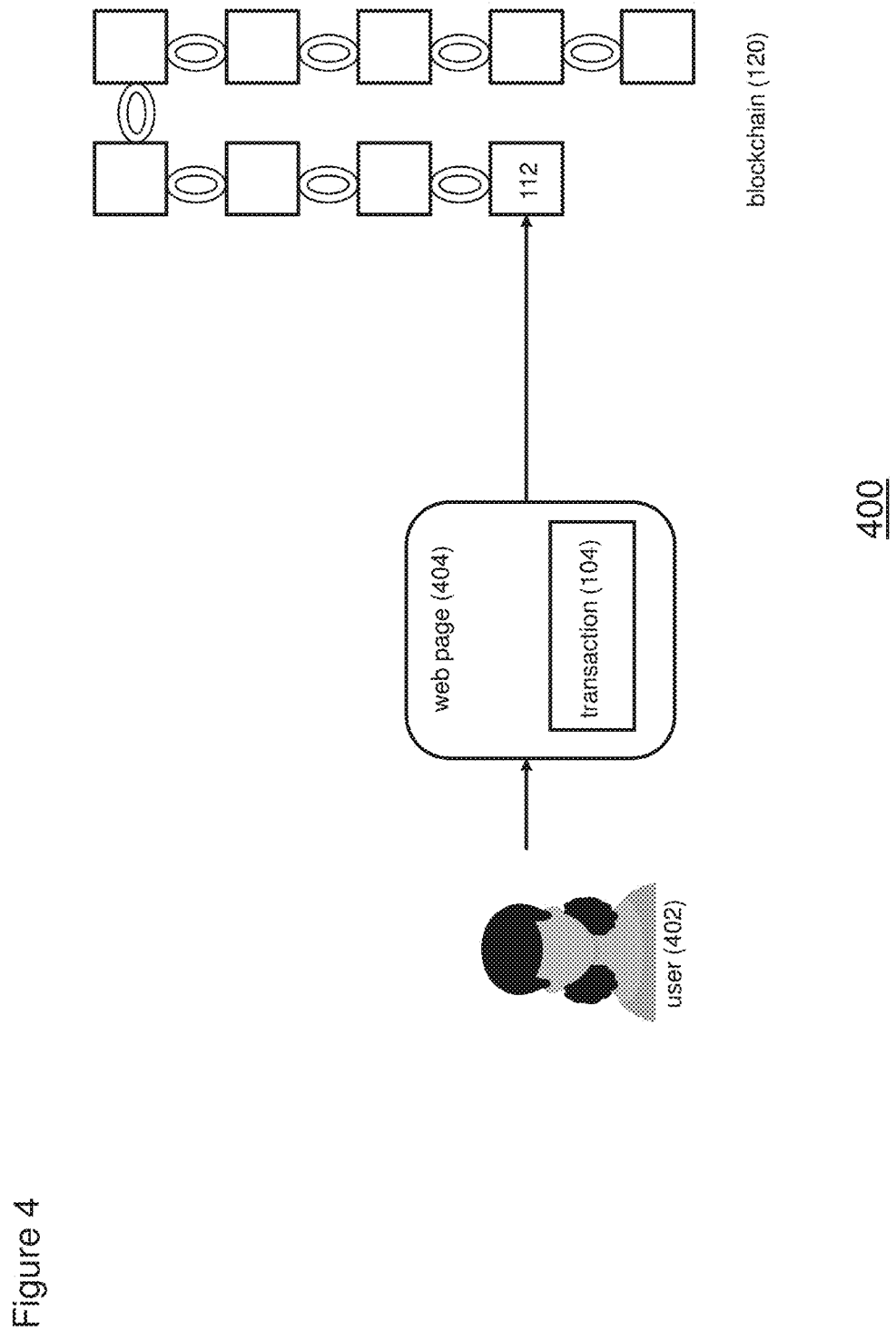
FIG. 4 is a simplified diagram of a system in which an existing node initiates a transaction, in accordance with some embodiments.

FIG. 4 is a simplified diagram of a system 400 in which a user initiates a transaction, according to some embodiments. A user 402, such as a human user, would like to engage in a transaction with another user (not shown). The user 402 may have access, via a cellphone, tablet, laptop computer, and so on, to a web page 404 or other graphical user interface (GUI), upon which software is loaded. Alternatively, the user 402 may access the GUI from an application on her cellphone. The GUI enables the user 402 to initiate a transaction such as the transaction 104 (FIG. 1). The transaction may be for example, a transfer of bitcoins to another user in exchange for a good or service being performed by the other user on behalf of the user 402. The record containing the transaction ends up on the blockchain 120, such as is illustrated in FIG. 1. The user 402 is generally unaware of the role the blockchain, or more specifically the nodes, in confirming the veracity of the transaction between the user and the other user.

As noted, the distributed ledger or blockchain is transparent. Thus, the distributed ledger is not generally used to store confidential information. The present disclosure provides for usage of blockchain in a secure manner such that the ledger can be used to store confidential information.

One usage case is, for example, a business that builds aircraft. Such a business may want to implement a blockchain-based system with its suppliers, such as to track movement of parts. However, having the suppliers able to access a conventional blockchain risks those suppliers gaining access to the entire bill of materials (BOM) of the manufacturer's aircraft, some of which may be confidential to the business.

Current distributed ledger systems lack features that could be used to maintain confidentiality of transactions, such as the transaction 104 that is part of the record 102 to be stored in the block 112 and then, ultimately, become part of the blockchain 120 (FIG. 1). One solution to maintain data confidentiality and access control is to omit the sensitive data from the ledger and manage it separately in a protected database. The ledger may store the hash of the sensitive data object, enabling the protected database to be queried to retrieve the sensitive data. However, such a model may be cumbersome and difficult to maintain. Further, the use of a separate database eliminates or at least mitigates the benefit of blockchain.

Another solution may be to use homomorphic encryption, which allows computation on encrypted data to take place, or multi-party computation, which allows two parties to jointly compute a function over inputs while keeping the inputs private. However, this adds significant computational overhead and is often difficult to implement in real-life applications.

Figure 5:
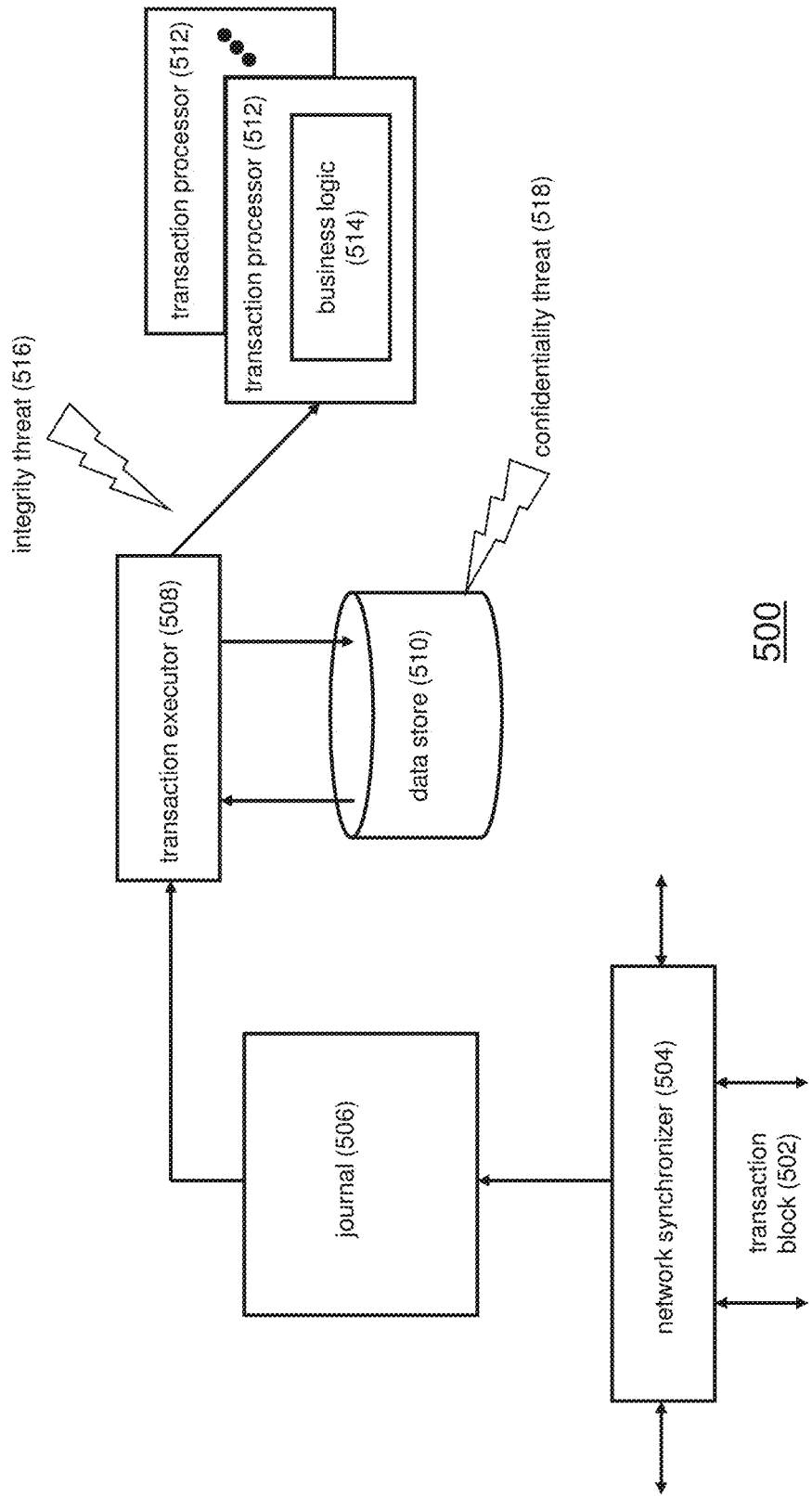
FIG. 5 is a simplified diagram of a distributed ledger or blockchain system, in accordance with some embodiments.

FIG. 5 is a simplified diagram of a node 500 of a distributed ledger or blockchain, according to some embodiments. A transaction block 502 is received into a network synchronizer 504 of the node 500, which distributes the transaction block to other nodes in the network, such as the network 300 in FIG. 3. Within the node 500, the network synchronizer 504 also sends the transaction block to the journal 506. The journal is an infrastructure to distribute transactions between different nodes, such as the nodes 302 (FIG. 3). A transaction executor 508 sends the transaction block 502 for processing to one or more transaction processors 512. In some embodiments, the transaction processors 512 are programmable code modules to validate transactions. In this example, within the transaction processor 412, business logic 514 is applied to the transaction block 502. A data store 510 is a repository of data (key value pairs) on behalf of the one or more transaction processors 512.

FIG. 5 shows that there are a couple of threats to the node 500. The first is an integrity threat 516, which may involve tampering of the transaction block 502 by a bad actor as it is sent to the transaction processor 512. The second is a confidentiality threat 518, in which the key value pairs stored in the data store 510 may be obtained by a bad actor.

Figure 6:
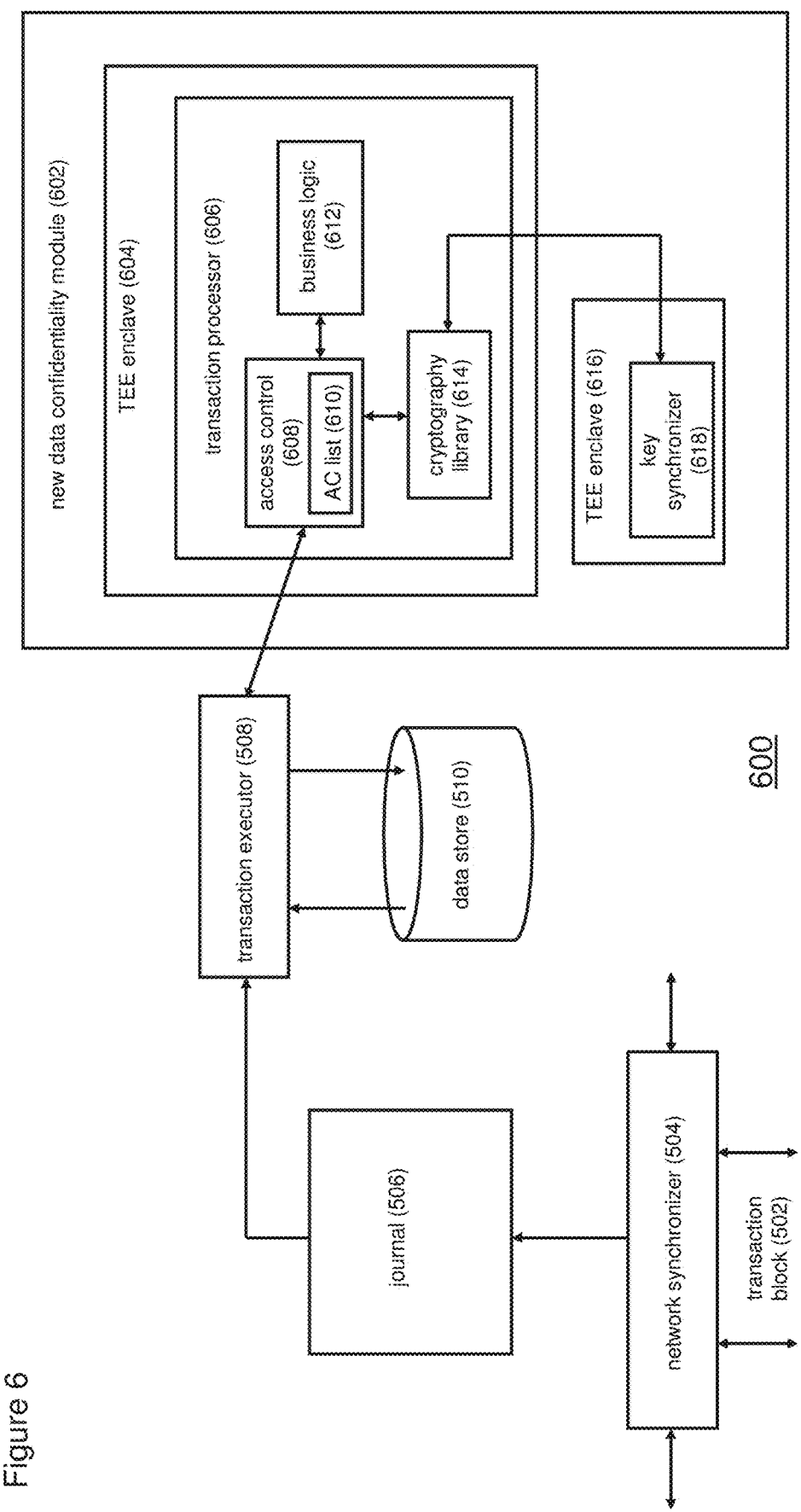
FIG. 6 is a simplified diagram of a system for data confidentiality in a distributed ledger, in accordance with some embodiments.

FIG. 6 is a simplified diagram of a system for data confidentiality in a distributed ledger 600, according to some embodiments. The system 600 is a node of the node network such as in FIG. 3, and is designed to prevent both the integrity and confidentiality threats illustrated in FIG. 5. The node 600 allows encrypted data to be stored on the distributed ledger while enforcing its secure processing and access control. In some embodiments, blockchain transaction sent by the existing nodes include a payload encrypted with a ledger key (LK). The ledger key (LK) is shared between the nodes of the distributed ledger and protected using a Trusted Execution Environment (TEE), such as Intel® Software Guard Extensions (SGX). A TEE provides hardware-assisted security to the system by taking sensitive parts of an application and allowing the application to be run from within CPU-hardened enclaves.

The node 600 features elements of the node 500, including a transaction block 502 to be received and distributed by the network synchronizer 504, a journal 506, a transaction executor 508 and a data store 510. Additionally, the node 600 includes a new data confidentiality module 602, which includes, in some embodiments, two TEE enclaves 604 and 616. These enclaves are isolated environments or private regions of memory which are secured from being accessible by programs and applications running on the platform, including the operating system. In other embodiments, a single TEE enclave is used by the new data confidentiality module 602. In still other embodiments, the new data confidentiality module 602 includes other TEE implementations besides SGX.

In some embodiments, the nodes of the distributed ledger allow access to the encrypted data while enforcing access control policies. The ledger nodes may be, for example, the interconnected nodes 302 of FIG. 3, each of which holds the blockchain 120. The blockchain consists of the data history (each block in the chain is essentially a data change). Using bitcoin as an example, the data change may be, for example, moving 10 bitcoins from user A to user B, and the current state of the data in the local database (A has 40 bitcoins, B has 20 bitcoins). In some embodiments, the current data state is accessed and modified as key pairs (ID and data), so can be stored as {(A, 40), (B, 20)} or {(user_balance, A=40:B=20)} or however the business logic decides to save it. In other ledgers, the local database may be organized like a structured query language (SQL) table-oriented database. The blockchain "smart contracts" are executed in the SGX-based isolated environment that allows the smart contract logic to be applied on the nodes data, whatever its form.

In some embodiments, the system for data confidentiality in a distributed ledger 600 preserves the qualities of the distributed ledger or blockchain, including transparency, redundancy, and integrity. Further, in some embodiments, the system 600 is a confidential system, opening blockchain technology to heretofore unexplored use cases. The system is scalable, relying on the existing distributed ledger mechanisms and not introducing new infrastructure elements, in some embodiments. The system 600 also provides security by strengthening the end-to-end process.

In some embodiments, the system for data confidentiality in a distributed ledger 600 is implemented in a system that includes a distributed ledger (DL) or blockchain infrastructure that provides 1) a multi-node system that agree on a common state of the ledger; 2) an infrastructure to distribute transactions between the different nodes of the system (journal); 3) a programmable code module to validate transactions (transaction processor); and 4) a data store that allows the transaction processor to store and retrieve data (key value pairs).

The node 600 augments the distributed ledger by running a transaction processor 606 inside the TEE enclave 604, thus protecting its code and data from the underlying system. In some embodiments, the transaction processor 606 consists of 1) access control logic 608, which maintains and enforces the access control policies; 2) business logic 612, which performs a confidential implementation of the blockchain smart contract; and a cryptographic library 614, which supports cryptographic operations with use of the ledger keys (not shown). Further, in some embodiments, the new data confidentiality module 602 includes a key synchronizer 618. Although embedded within its own TEE enclave 616 in this example, the key synchronizer 618 may alternatively be part of the TEE enclave 604 along with the access control 608, business logic 612, and cryptographic library 614. In some embodiments, the key synchronizer 618 ensures a secure delivery of ledger keys according to the access control logic 608. In some embodiments, the access control logic 608 maintains a list 610, which governs which operations can be done by the various participants and what data can be accessed by the participants.

Also used by the node 600 are ledger keys (not shown), in some embodiments. The ledger keys are a set of cryptographic keys used in blockchain operations, such as decrypting transactions, encrypting transactions, and decrypting data from/to the ledger data store, encrypting results for existing node requests, and so on.

To figure out whether a transaction is valid, one approach is to go far back in time and look at all the transactions of the distributed ledger or blockchain that occurred until the present. With bitcoin, for example, a user is given some bitcoins, and this transaction is added to a block of the blockchain. The user may leave the bitcoins in her possession unused. At some future time, though, the user may like to transfer her bitcoins to another user as part of a transaction between them. For the system to figure out whether this transaction, which moves bitcoins from the user to a new user, is valid, the system tracks the bitcoins, that is, finds the transaction that gave the original user her bitcoins. And, those bitcoins can move from user to user over the course of time. To simplify the execution of the logic and to avoid the system having to browse through the entire history of the blockchain, ledgers provide some infrastructure to the logic that will help it with the calculations.

Because the logic may vary significantly from one usage to another, general purpose distributed ledgers may assign to a smart contract a key value pair, meaning the smart contract uses the keys to store and retrieve data. For example, the ledger may store the key value pair of the smart contract in the ledger. Subsequently, the information may be retrieved to figure out whether a transaction is valid or not. So, as a general matter, many different addresses may be used. From the ledger perspective, the data is known as a binary large object (BLOB).

Thus, the system can avoid browsing the history of the blockchain, which by its very nature becomes longer and longer over time, with such recordkeeping. With bitcoin, for example, transactions that have not been spent are kept in a list. Whenever a new transaction is initiated, the transaction in bitcoin specifies its inputs. Where the user got the bitcoins will be in the list. The new transaction means the bitcoin will be removed from the unspent transaction list, and the recipient user of the bitcoin will be added to the unspent transaction list. The idea of this list is to simplify determining whether a transaction is valid.

The business logic 514 enables the confidential implementation of the blockchain smart contract, in some embodiments. The business logic 514 runs the smart contract in the transaction processor 606, which is within the secure TEE enclave 604. Such protection of confidential information may have many applications. For example, a stock exchange is working with selected banks to implement some business logic regarding lending and borrowing of stocks between the banks. Banks, as rivals, would not like their competitors to know what they are looking for or what they are offering. But, as a community, these same banks do want to share and have a common market for borrowing and lending securities. Because everything is being executed in a TEE, the infrastructure of the new data confidentiality module 602 of FIG. 6 would allow each bank to send or receive a transaction that other banks are unable to see, figure out whether the transaction is valid or not, determine whether a resource that is part of the transaction is available or not, and obtain results, without exposing sensitive information to the rival banks. So, the smart contract in this example is whether there are enough stocks to lend, whether the borrowing is valid, whether an entity is trying to lend stocks that it owns, and so on. And to do this, different types of information are stored outside the smart contract in the data store.

In this example, the business logic smart contract would involve how to handle transactions that refer to borrowing and lending of stocks. The data to be stored would be the number of stocks each bank has, how many stocks are part of a contract between two banks, and so on, with such confidential information being hidden from rival banks. In FIG. 6, the data store 510 is outside the TEEs. Thus, before being stored there, the data would be encrypted.

FIGS. 7-12 are diagrams showing operations of an apparatus that implements the system for data confidentiality in a distributed ledger 600 of FIG. 6, according to some embodiments. It is noted, that these diagrams are described with reference to operations or "blocks" of the flow diagrams. These "blocks" are not to be confused or interpreted to mean blocks of a blockchain (e.g., block 112, or the like).

Figure 7:
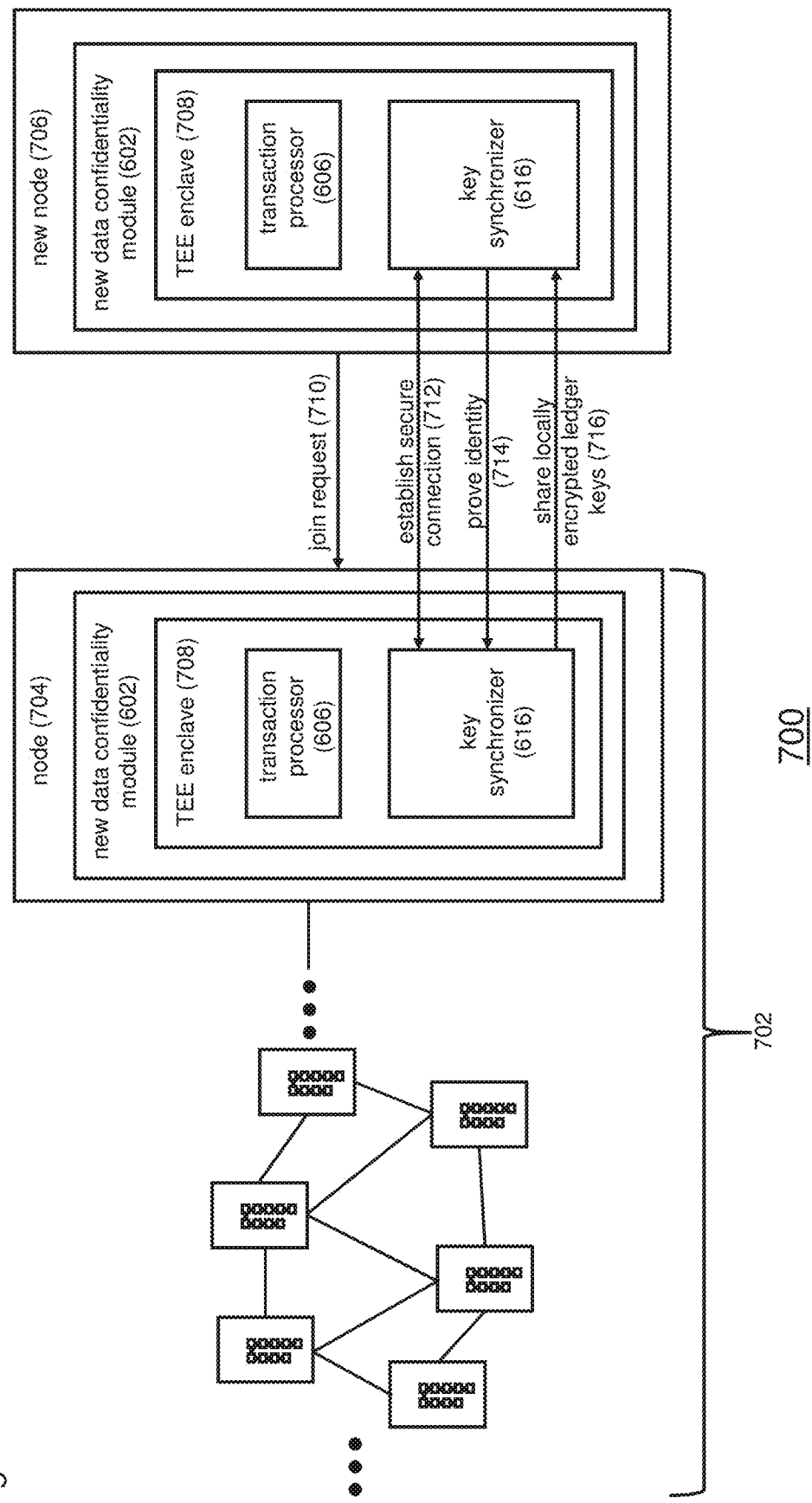
FIG. 7 is a schematic diagram in which a new node joins a node network, such as the blockchain infrastructure of FIG. 3, according to some embodiments.

FIG. 7 depicts schematic operations 700 in which a new node, such as the node 706, joins a network 702, such as the network 300 (FIG. 3), which includes an existing node 704. In this example, the existing node 704 and the new node 706 each include a single TEE enclave 708 which includes both the transaction processor 606 and the key synchronizer 618.

The new node 706 desires to join the network 702, indicated by a join request (block 710). The new node establishes a secure channel with an existing node that is already part of the network (block 712). Using remote attestation or a similarly secure mechanism, the new node 706 proves its identity to the existing node 704. Remote attestation is a method by which the new node 706 authenticates its hardware and software configuration to a remote server, in this case, the already existing node 704. The existing node is to determine whether to trust the integrity of the new node. Remote attestation is beyond the scope of this disclosure. Before proceeding further, the identity of the new node 706 is proven to the existing node 704 (block 714).

Once proven, the new node 706 is able to acquire the ledger keys (block 716). In some embodiments, the ledger keys are stored encrypted locally. The operations 712, 714, and 716 take place within the sealed security of the TEE. In some embodiments, the ledger keys are saved in the data store of the new node 706. In other embodiments, the ledger keys are saved on a local disk drive of the new node. In either case, because the ledger keys are encrypted and signed, they are secure from modifications. The functionality for locally encrypting and storing the ledger keys is performed by the key synchronizer 618, also sealed within the TEE enclave.

Figure 8:
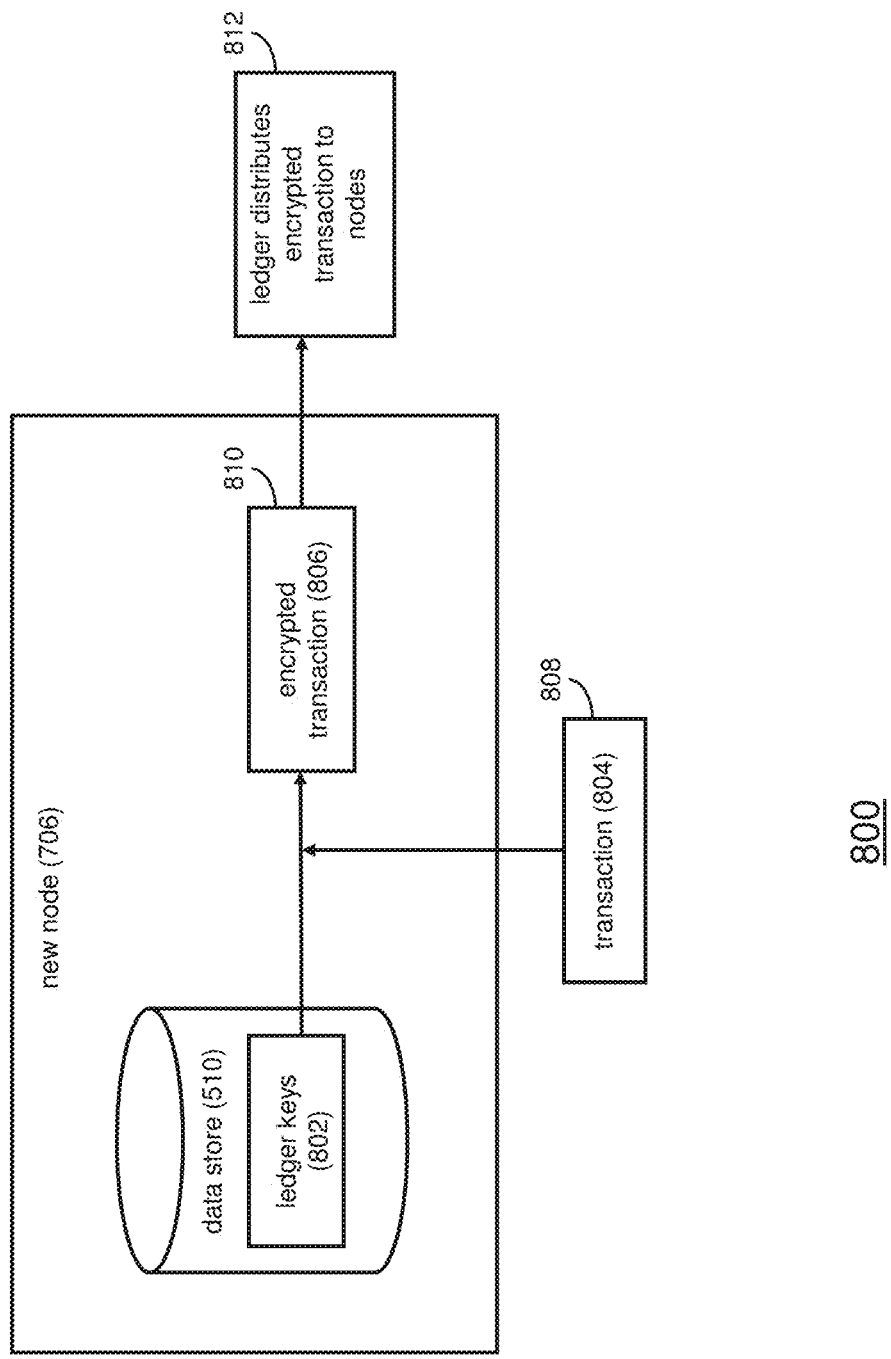
FIG. 8 is a schematic diagram showing operations for sending a transaction to the distributed ledger by a node, according to some embodiments.

FIG. 8 is a schematic diagram showing operations 800 for sending a transaction to the distributed ledger, according to some embodiments. A transaction 804 may be initiated by the user 402 of FIG. 4, for example. In this example, the new node 706 of FIG. 7 processes the transaction 804, although any node of the blockchain may be used. The new node 706 wishes to send the transaction to the distributed ledger or blockchain. The new node encrypts the transaction using ledger keys 802 obtained when joining the network (FIG. 7) (block 810). In some embodiments, the encryption is done by generating one-time symmetric key (for example, using Diffie Hellman techniques) to exchange the symmetric key with the ledger, but using the published public key of the ledger will also work. Diffie Hellman, one of the first public key protocols, is a method of securely exchanging cryptographic keys over a public channel. Once encrypted, the ledger distributes the encrypted transaction 806 to the nodes of the network (block 812) for processing.

Figure 9:
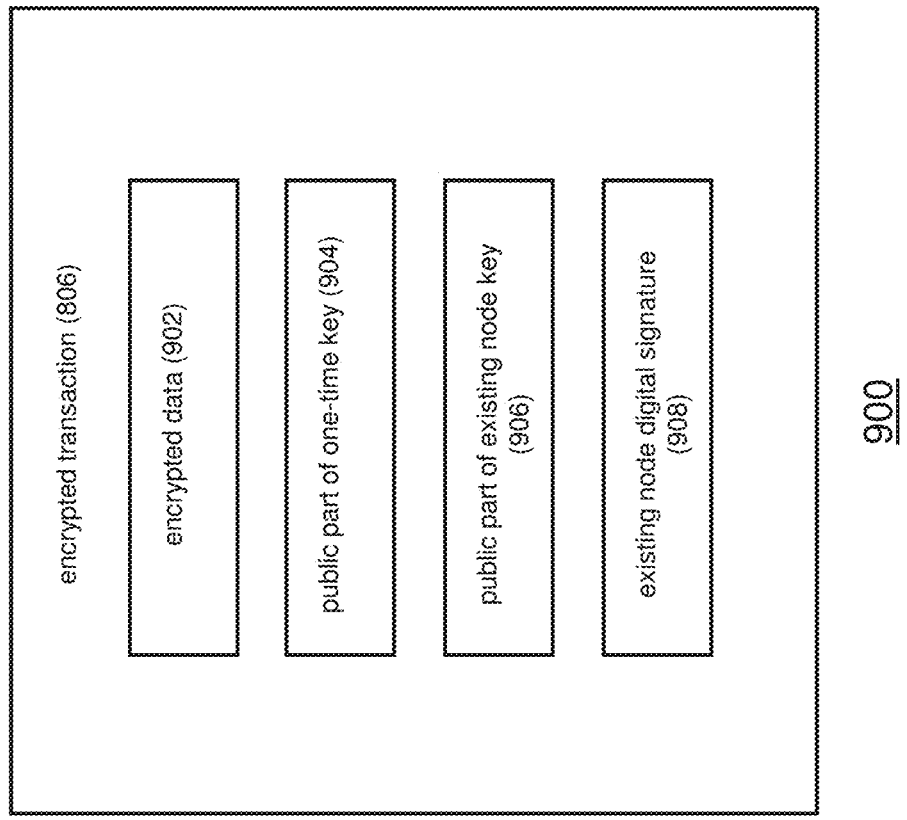
FIG. 9 is a simplified block diagram showing the elements of the encrypted transaction used by the system for data confidentiality of FIG. 6, according to some embodiments.

FIG. 9 is a block diagram 900 illustrating the contents of the encrypted transaction 806, according to some embodiments. The encrypted transaction consists of 1) the encrypted data 902; 2) the public part of the one-time key 904, which is used by the ledger to generate the one-time symmetric key and decrypt the data); 3) the public part of the existing node key 906 which identifies the existing node, enabling the access control layer to check its permissions), and 4) the existing node digital signature 908, which is used by the ledger to verify that indeed this data came from the existing node.

Figure 10:
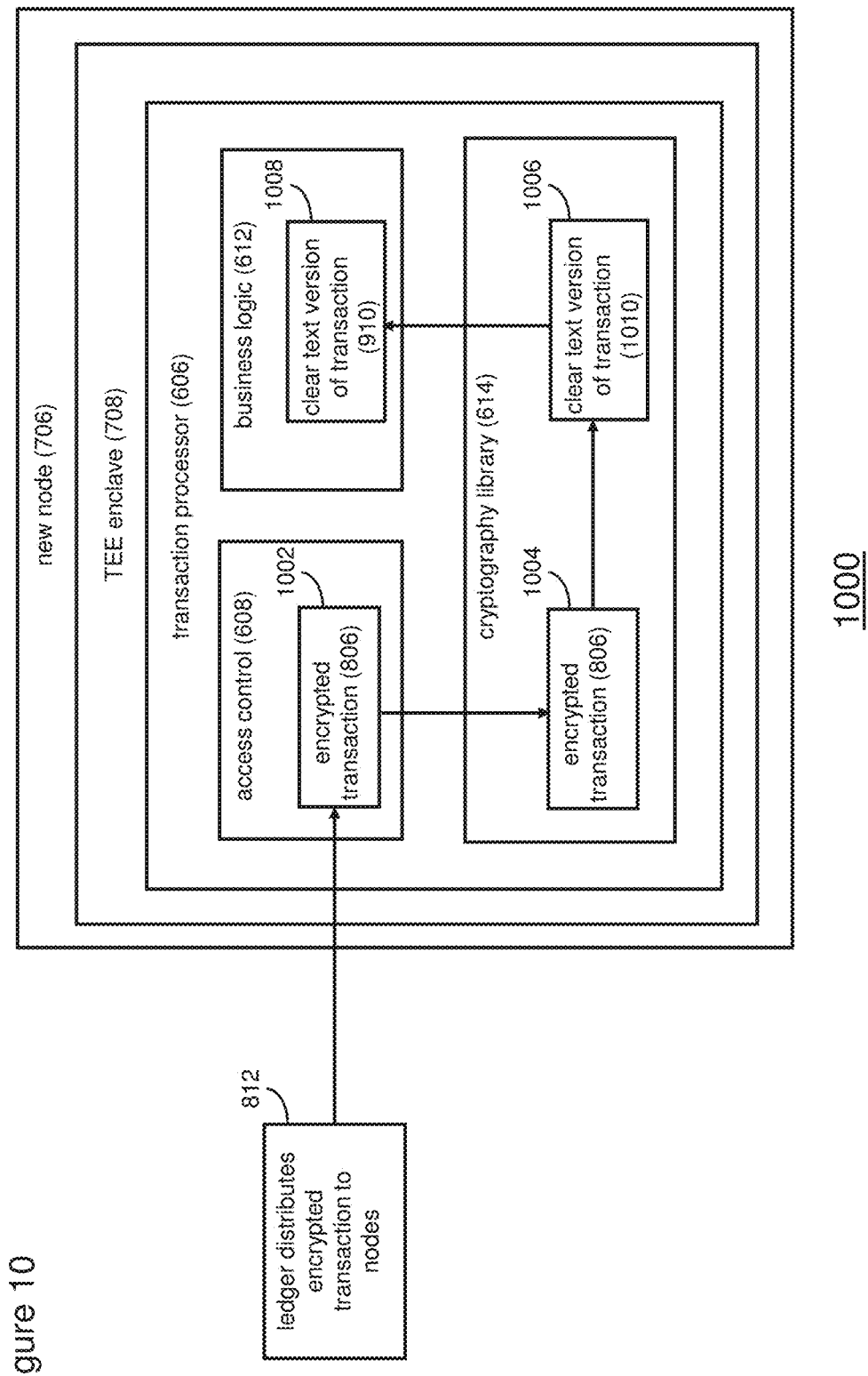
FIG. 10 is a schematic diagram showing operations of the transaction processor of the system for data confidentiality in a distributed ledger of FIG. 6, according to some embodiments.

FIG. 10 is a schematic diagram showing operations 1000 of the transaction processor, such as the transaction processor 606 of FIG. 6, according to some embodiments. Recall from FIG. 8 that the ledger distributes the encrypted transaction to the nodes of the node network (block 812). When the transaction 804 reaches the access control 608 of the transaction processor 606 inside the TEE enclave 708 (block 1002), the access control layer sanitizes the request (transaction), in some embodiments, ensuring that transaction is from a known origin (the new node 706). As described, the transactions are encrypted, but they are also digitally signed (FIG. 9). When a transaction is digitally signed, the payload of the transaction is used to calculate a hash value, and a private key of the existing node is used to sign the hash. The existing node is then able to provide its public key and the hash of the transaction to prove its identity. This is how the access control unit 608 of the transaction processor 606 knows the transaction is from a known origin.

The access control unit also manages an access control list 610 (FIG. 6). In some embodiments, the access control list 610 governs which operations can be done by the various participants (existing nodes) and what data the participants can access. These operations are managed by the access control layer 608. In some embodiments, the access control list 610 consists of pre-defined transactions. In other embodiments, the access control list 610 is built at runtime using dedicated transactions. The root of trust of the ledger is the signer of the transaction processor, or the programmer. Because the signer of the transaction processor can modify the transaction processor, the signer is the root of trust.

Once the transaction 806 passes the access control layer (block 1002), the transaction is sent for decryption by the cryptography library (block 1004). In some embodiments, the cryptography library uses the ledger keys 802 to decrypt the content of the transaction, resulting in a clear text version of the transaction 1010 (block 1006). Even though the transaction is now decrypted, it is still part of the transaction processor 606 inside the TEE, and thus safe from integrity threats such as the integrity threat 516 of FIG. 5.

The decrypted transaction 1010 is then sent, as a clear text version, to a logic layer (block 1008), where the business logic is applied. In the example of the stock exchange described above, suppose a bank wants to buy 10 shares of stock W for price Z. The business logic would be a program that decides whether the seller actually owns stock W that the bank wants to buy. The program would also determine whether the seller actually is offering stock W at price Z. In some embodiments, the application of the business logic is not unlike how legacy systems implement the logic, except that the transaction is secured inside the TEE hardware.

Figure 11:
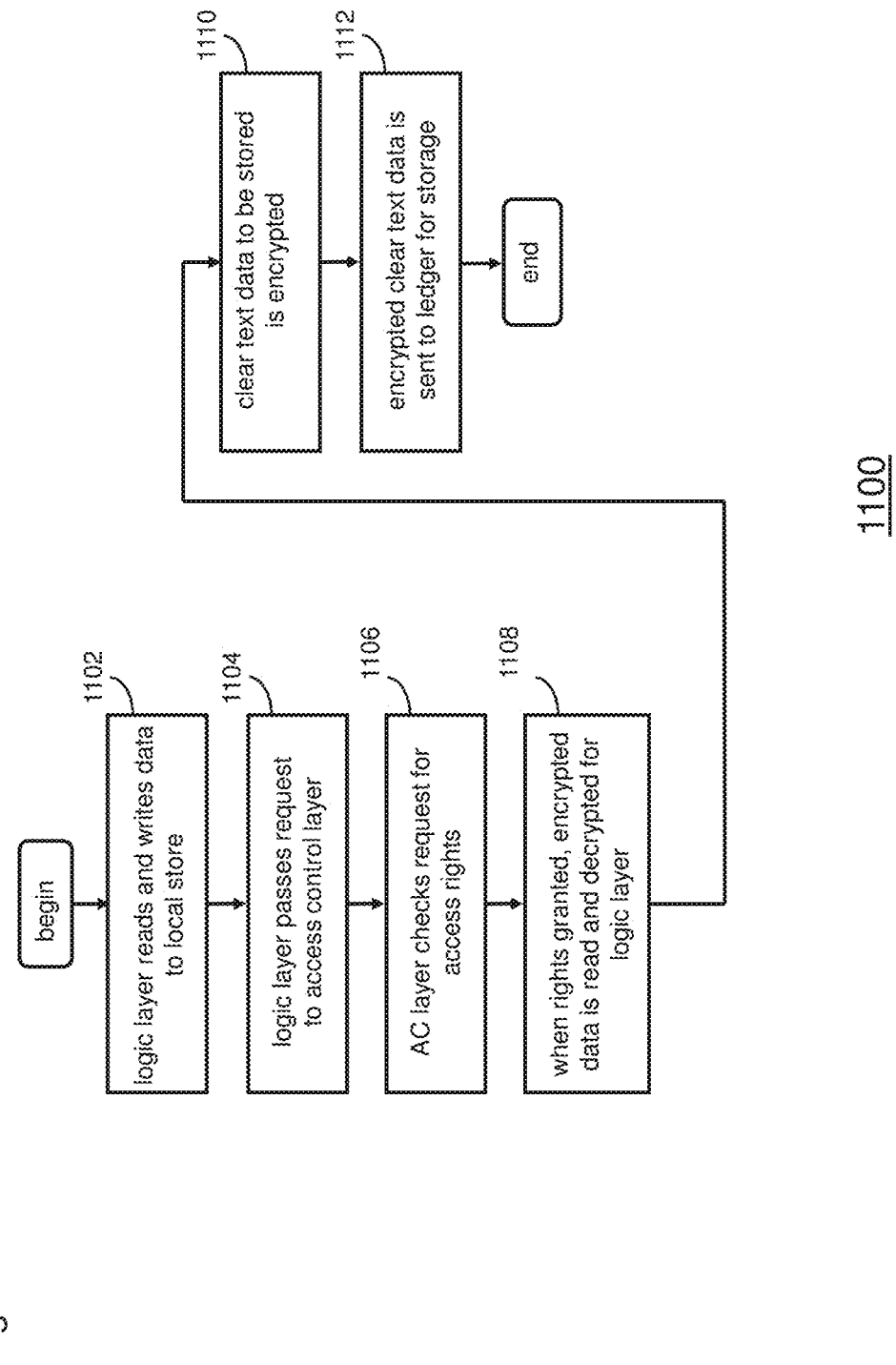
FIG. 11 is a flow diagram showing operations for reading or writing data following execution of the business logic on a transaction as part of the system for data confidentiality in a distributed ledger of FIG. 6, according to some embodiments.

FIG. 11 is a flow diagram showing operations 1100 for reading or writing data as a result of the business logic being applied to the transaction (FIG. 10), according to some embodiments. To read or write data to the local data store, which is outside the TEE enclave, (block 1102), the logic layer passes the requests to the access control layer (block 1104), still within the TEE enclave 604 of the transaction processor 606. At the access control layer, the requests are checked for access rights (block 1106). When the access rights are granted, the encrypted data is read and decrypted for the logic layer (block 1108). The clear text data to be stored is encrypted (block 1110) and is sent to the ledger infrastructure for storage (block 1112).

Figure 12:
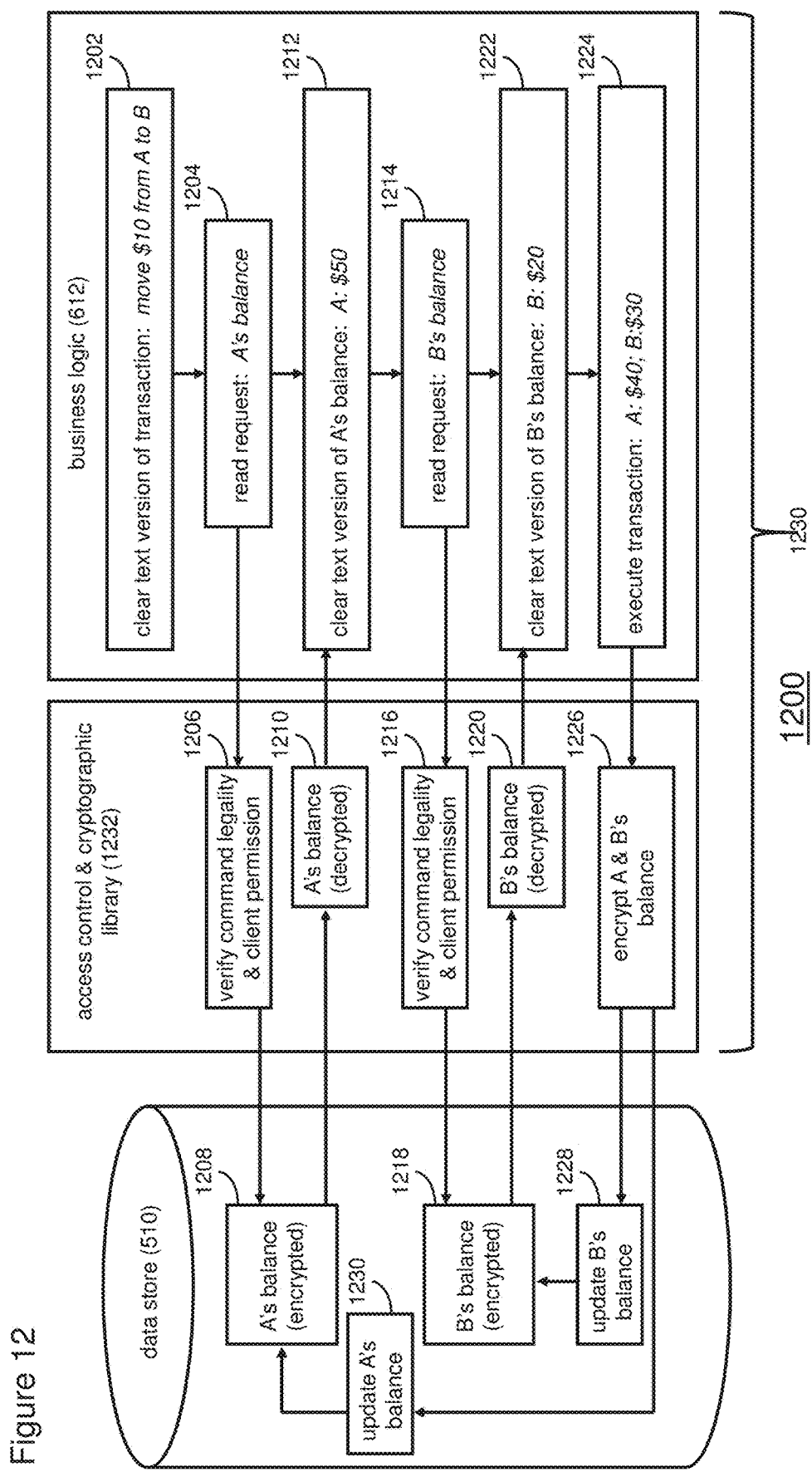
FIG. 12 is a schematic diagram illustrating an example in which the business logic reads or writes data in support of transaction processing as part of the system for data confidentiality in a distributed ledger of FIG. 6, according to some embodiments.

FIG. 12 is a schematic diagram 1200 illustrating how reading or writing data by the business logic is performed, according to some embodiments. In this example, a simple transaction illustrates the operations: move $10 from userA to user B. On the left side of the diagram 1200, which is one of the nodes of the node network, the data store 510, outside the protection of a TEE enclave 1230, is shown, and on the right side is the business logic 612, which is inside the TEE enclave. In the center is shows the access control and cryptographic library 1232, shown as a single unit.

The business logic 612 has a clear text version of the transaction: move $10 from userA to user B (block 1202). Before this transaction can be completed, the business logic needs to obtain the balance of user A's account and user B's account. Thus, a read request for user A's account balance is made (block 1204). The access control portion of block 1232 verifies that the command is legal and the existing node has permission to the transaction is completed (block 1206). The contents of user A's account balance, still in encrypted form, is obtained from the data store (block 1208). The cryptographic library portion of the block 1232, decrypts user A's account balance (block 1210) and this is sent to the business logic 612 as a clear text version: A: $50 (block 1212).

Similarly, the business logic 612 obtains user B's account balance by making a read request: B's balance (block 1214). Again, the access control unit verifies that the command is legal and the existing node has permission to the transaction is completed (block 1216), such that the contents of user B's account balance, still in encrypted form, is obtained from the data store (block 1218). The cryptographic library decrypts the balance (block 1220) and a clear text version of user B's account balance is available to the business logic: B: $20 (block 1222). Now, the business logic 612 has what it needs to execute the transaction: move $10 from A to B, resulting in: A: $40; B: $30 (block 1224). The updated balance of user A's account and user B's account is encrypted (block 1226), and the data store is updated to reflect user B's new balance (block 1228) and user A's new balance (block 1230).

The data in the data store 510 is encrypted and thus confidentiality threats such as in FIG. 5 are avoided. Further, because the data to which the business logic is applied are decrypted from within the TEE, integrity threats such as in FIG. 5 are also avoided. The system and method for data confidentiality in a distributed ledger thus provide protection from both confidentiality and integrity threats, in some embodiments.

Figure 13:
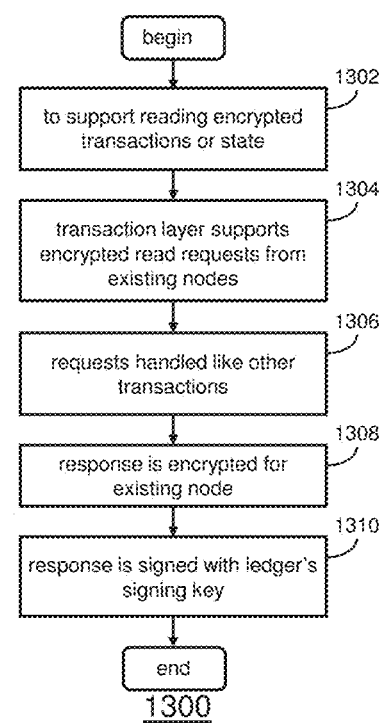
FIG. 13 is a flow diagram showing operations for supporting encrypted read requests by the system for data confidentiality in a distributed ledger, according to some embodiments.

FIG. 13 is a flow diagram showing operations 1300 for supporting encrypted read requests, according to some embodiments. To support reading encrypted transactions or state (the current state of the data store) (block 1302), in some embodiments, the transaction processor supports encrypted read requests from existing nodes (block 1304). The requests are handled like any transaction (passing the access control layer, etc.) (block 1306), in some embodiments, with the response being encrypted for the requestor (block 130). In some embodiments, the encryption uses a one-time symmetric key and DH for key exchange. In other embodiments, the public key of the requestor (e.g., the existing node) is used for the encryption. The response is also signed with the ledger's signing key so that the existing node can verify that the answer came from the ledger (block 1310).

For example, the existing node wants to know how much money A has currently. The node cannot read it directly from the data store because the information is encrypted. So, the existing node will initiate a read request, with similar data like in the transaction (encrypted request data, public one-time key, public existing node, existing node signature), and the ledger, after doing all the certifications and reading and decrypting the data, will return the result ($40) in the same way (encrypted response data, public one-time key, public ledger, ledger signature).

In summary, the system and method for data confidentiality in a distributed ledger may be implemented in a first example by an apparatus comprising a trusted execution environment (TEE) comprising a processor and memory coupled to the processor, the memory comprising instructions that when executed by the processor cause the processor to receive an encrypted transaction from an existing node, the encrypted transaction having been encrypted using ledger keys, the encrypted transaction to be distributed to a plurality of nodes of a network, and apply business logic to the transaction, and a data storage to store the ledger keys.

Further to the first example or any other example discussed herein, in a second example, the TEE of the apparatus further comprising a cryptographic library to decrypt the encrypted transaction using the ledger keys, wherein the decrypted version of the transaction comprises a clear text version of the transaction.

Further to the second example or any other example discussed herein, in a third example, the business logic of the apparatus is applied to the clear text version of the transaction.

Further to the third example or any other example discussed herein, in a fourth example, the transaction of the apparatus, once the business logic is applied, becomes an executed transaction and the executed transaction is encrypted.

Further to the first example or any other example discussed herein, in a fifth example, the TEE of the apparatus further comprises an access control unit to verify that the existing node is allowed to participate in the transaction and confirm the existing node is able to access data associated with the transaction.

Further to the fifth example or any other example discussed herein, in a sixth example, the access control unit of the apparatus further comprising an access control list to indicate which of the plurality of nodes is allowed to participate in the transaction.

Further to the sixth example or any other example discussed herein, in a seventh example, the access control list of the apparatus further to indicate what data related to the transaction is accessible.

Further to the first example or any other example discussed herein, in an eighth example, the TEE of the apparatus further comprising a key synchronizer to establish a secure connection to the existing node in response to receiving a join request from the existing node and share the ledger keys with the existing node in response to the existing node proving its identity.

Further to the eighth example or any other example discussed herein, in a ninth example, the existing node of the apparatus proves its identity using remote attestation.

Further to the ninth example or any other example discussed herein, in a tenth example, the transaction comprises encrypted data, the public part of a one-time key to be used to generate a one-time symmetric key to decrypt the data, the public part of an existing node key, which identifies the existing node, and a signature, used to verify that the encrypted data came from the existing node.

The system and method for data confidentiality in a distributed ledger may be implemented in an eleventh example by an apparatus, comprising a trusted execution environment (TEE) comprising a processor and memory coupled to the processor, the memory comprising instructions that when executed by the processor cause the processor to receive an encrypted transaction from an existing node, wherein the transaction was encrypted using ledger keys distributed to a plurality of nodes of a network, decrypt the encrypted transaction using the ledger keys, resulting in a clear text version of the transaction, and apply business logic to the clear text version of the transaction, resulting in an updated transaction, wherein the updated transaction is encrypted using the ledger keys before leaving the TEE.

Further to the eleventh example or any other example discussed herein, in a twelfth example, the TEE of the apparatus further comprises a cryptographic library to decrypt the encrypted transaction.

Further to the eleventh example or any other example discussed herein, in a thirteenth example, the TEE of the apparatus further comprises an access control unit to verify that the existing node is allowed to participate in the transaction, and confirm the existing node is able to access data associated with the transaction, wherein the access control unit consults an access control list to verify and confirm.

Further to the eleventh example or any other example discussed herein, in a fourteenth example, the apparatus comprises a key synchronizer to establish a secure connection to the existing node in response to receiving a join request, and share the ledger keys with the existing node in response to the existing node proving its identity.

The system and method for data confidentiality in a distributed ledger may be implemented in a fifteenth example by at least one machine-readable storage medium comprising instructions that, when executed by a processor, cause the processor to receive an encrypted transaction from an existing node, the encrypted transaction to be distributed to a plurality of nodes of a network, decrypt the encrypted transaction from within a trusted execution environment (TEE), resulting in a decrypted transaction, and apply business logic to the decrypted transaction inside the TEE, resulting in an updated transaction, wherein the updated transaction is encrypted before being sent outside the TEE.

Further to the fifteenth example or any other example discussed herein, in a sixteenth example, the at least one machine-readable storage medium comprises instructions that further obtain ledger keys by a cryptographic library located inside the TEE, wherein the ledger keys are used to decrypt the encrypted transaction and encrypt the updated transaction.

Further to the fifteenth example or any other example discussed herein, in a seventeenth example, the at least one machine-readable storage medium comprises instructions that further initiate a read request for data by the business logic, wherein the data is relevant to the decrypted transaction, receive verification from an access control unit inside the TEE that the read request is permissible, receive a decrypted data from a cryptographic library inside the TEE, wherein the cryptographic library obtained and decrypted the data from a data store external to the TEE, resulting in the decrypted data, wherein the decrypted data enables the implementation of the business logic on the decrypted transaction.

Further to the seventeenth example or any other example discussed herein, in an eighteenth example, the at least one machine-readable storage medium comprises instructions that further implement the business logic on a clear text version of the transaction.

Further to the fifteenth example or any other example discussed herein, in a nineteenth example, the at least one machine-readable storage medium comprises instructions that further establish, by a key synchronizer inside the TEE, a secure connection to the existing node in response to receiving a join request from the existing node, and share the ledger keys with the existing node in response to the existing node proving its identity.

Further to the fifteenth example or any other example discussed herein, in a twentieth example, the at least one machine-readable storage medium comprises instructions that further cause the processor to receive the encrypted transaction comprising encrypted data, the public part of a one-time key to be used to generate a one-time symmetric key to decrypt the data, the public part of an existing node key, which identifies the existing node, and a signature, used to verify that the encrypted data came from the existing node.

The system and method for data confidentiality in a distributed ledger may be implemented in a twenty-first example by a method comprising receiving an encrypted transaction from an existing node, the encrypted transaction to be distributed to a plurality of nodes of a network, decrypting the encrypted transaction from within a trusted execution environment (TEE), resulting in a decrypted transaction, and applying business logic to the decrypted transaction inside the TEE, resulting in an updated transaction, wherein the updated transaction is encrypted before being sent outside the TEE.

Further to the twenty-first example or any other example discussed herein, in a twenty-second example, the method further comprises obtaining ledger keys by a cryptographic library located inside the TEE, wherein the ledger keys are used to decrypt the encrypted transaction and encrypt the updated transaction.

Further to the twenty-first example or any other example discussed herein, in a twenty-third example the method further comprises initiating a read request for data by the business logic, wherein the data is relevant to the decrypted transaction, receiving verification from an access control unit inside the TEE that the read request is permissible, and receiving a decrypted data from a cryptographic library inside the TEE, wherein the cryptographic library obtained and decrypted the data from a data store external to the TEE, resulting in the decrypted data, wherein the decrypted data enables the implementation of the business logic on the decrypted transaction.

Further to the twenty-third example or any other example discussed herein, in a twenty-fourth example, the method further comprises implementing the business logic on a clear text version of the transaction.

Further to the twenty-first example or any other example discussed herein, in a twenty-fifth example, the method further comprises establishing, by a key synchronizer inside the TEE, a secure connection to the existing node in response to receiving a join request from the existing node, and sharing the ledger keys with the existing node in response to the existing node proving its identity.

Further to the twenty-first example or any other example discussed herein, in a twenty-sixth example, the method further comprises receiving the encrypted transaction comprising encrypted data, the public part of a one-time key to be used to generate a one-time symmetric key to decrypt the data, the public part of an existing node key, which identifies the existing node, and a signature, used to verify that the encrypted data came from the existing node.

The system and method for data confidentiality in a distributed ledger may be implemented in a twenty-seventh example by in at least one machine-readable storage medium comprising instructions that, when executed by a processor, to implement a method or realize an apparatus as claimed in any preceding claim.

Some embodiments may be described using the expression "one embodiment" or "an embodiment" along with their derivatives. These terms mean that a feature, structure, or characteristic described relating to the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

The invention claimed is:

1. An apparatus, comprising:
a data storage device to store ledger keys; and
a trusted execution environment (TEE) comprising:
a processor; and
memory coupled to the processor, the memory comprising instructions that when executed by the processor cause the processor to:
receive an encrypted transaction from a node of a plurality of nodes of a public network, the encrypted transaction having been encrypted using ledger keys and distributed to a public ledger on a blockchain maintained and accessible by the plurality of nodes of the public network,
wherein the ledger keys for the encrypted transaction are known to only a subset of the nodes of the public network, the subset including the node,
wherein the encrypted transaction comprises encrypted data, a public part of a one-time key, a public part of an existing node key, and a signature,
identify the node based on the public part of the existing node key,
verify the encrypted transaction originated from the identified node based on the signature,
generate a one-time symmetric key based on the public part of the one-time key, and
decrypt the encrypted data based on the one-time symmetric key and the ledger keys.

2. The apparatus of claim 1, wherein the decrypted version of the transaction comprises a clear text version of the transaction.

3. The apparatus of claim 1, the instructions when executed by the processor, cause the processor to:
verify that the node is allowed to participate in the transaction; and
confirm the node is able to access data associated with the transaction.

4. The apparatus of claim 1, the instructions when executed by the processor, cause the processor to:
establish a secure connection to the node in response to receiving a join request from the node; and
share the ledger keys with the node in response to the node proving its identity.

5. The apparatus of claim 3, the memory comprising an access control list and the instructions, when executed by the processor cause the processor to indicate which of the plurality of nodes of the public network are allowed to participate in the transaction.

6. The apparatus of claim 4, wherein the node proves its identity using remote attestation.

7. The apparatus of claim 5, the access control list further to indicate what data related to the transaction is accessible.

8. An apparatus, comprising:
a trusted execution environment (TEE) comprising:
a processor; and
memory coupled to the processor, the memory comprising instructions that when executed by the processor cause the processor to:
receive an encrypted transaction from a node of a plurality of nodes of a public network, wherein the encrypted transaction was encrypted using ledger keys distributed to only a subset of the plurality of nodes of the public network, the subset including the node, the encrypted transaction distributed to a public ledger on a blockchain maintained and accessible by the plurality of nodes of the public network and comprising encrypted data, a public part of a one-time key, a public part of an existing node key, and a signature,
identify the node based on the public part of the existing node key,
verify the encrypted transaction originated from the identified node based on the signature,
generate a one-time symmetric key based on the public part of the one-time key, and
decrypt the encrypted data based on the one-time symmetric key and the ledger keys.

9. The apparatus of claim 8, the memory comprising a cryptographic library and the instructions, when executed by the processor cause the processor to decrypt the encrypted transaction.

10. The apparatus of claim 8, the instructions when executed by the processor, cause the processor to: verify that the node is allowed to participate in the transaction; and confirm, based on an access control list, the node is able to access data associated with the transaction.

11. The apparatus of claim 8, the instructions when executed by the processor, cause the processor to:
establish a secure connection to the node in response to receiving a join request; and share the ledger keys with the node in response to the node proving its identity.

12. At least one machine-readable storage medium comprising instructions that, when executed by a processor, cause the processor to:

receive an encrypted transaction from a node of a plurality of nodes of a public network, the encrypted transaction encrypted using ledger keys and distributed to a public ledger on a blockchain maintained and accessible by the plurality of nodes of the public network and comprising encrypted data, a public part of a one-time key, a public part of an existing node key, and a signature, wherein the ledger keys for the encrypted transaction are known to only a subset of the nodes of the public network, the subset including the node;

identify the node based on the public part of the existing node key;

verify the encrypted transaction originated from the identified node based on the signature;

generate, within a trusted execution environment (TEE), a one-time symmetric key based on the public part of the one-time key;

decrypt, within the TEE, the encrypted data based on the one-time symmetric key and the ledger keys;

generate, within the TEE, an updated transaction from the decrypted transaction;

encrypt, within the TEE, the updated transaction using the ledger keys; and distribute the encrypted updated transaction to the public ledger maintained by the plurality of nodes of the public network.

13. The at least one machine-readable storage medium of claim 12, comprising instructions that further cause the processor to:

obtain the ledger keys based on a cryptographic library located inside the TEE, wherein the ledger keys are used to: decrypt the encrypted transaction and encrypt the updated transaction.

14. The at least one machine-readable storage medium of claim 12, comprising instructions that further cause the processor to:

establish, by a key synchronizer inside the TEE, a secure connection to the node in response to receiving a join request from the node; and share the ledger keys with the node in response to the node proving its identity.

* * * * *